(12) United States Patent
Olson et al.

(10) Patent No.: US 7,478,233 B2
(45) Date of Patent: Jan. 13, 2009

(54) PREVENTION OF SOFTWARE TAMPERING

(75) Inventors: Erik B. Olson, Sammamish, WA (US); Eric K. Zinda, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 770 days.

(21) Appl. No.: 10/157,117

(22) Filed: May 30, 2002

(65) Prior Publication Data

US 2003/0226007 A1 Dec. 4, 2003

(51) Int. Cl.
*H04L 9/00* (2006.01)
*G06F 7/58* (2006.01)

(52) U.S. Cl. .................. 713/150; 713/161; 726/21; 380/280; 705/59

(58) Field of Classification Search .......... 713/150, 713/161; 726/21; 380/280
See application file for complete search history.

(56) References Cited

U.S. PATENT DOCUMENTS

| | | | | | |
|---|---|---|---|---|---|
| 4,797,672 | A | * | 1/1989 | Kousa | 340/5.26 |
| 4,803,725 | A | * | 2/1989 | Horne et al. | 380/44 |
| 5,235,642 | A | * | 8/1993 | Wobber et al. | 713/156 |
| 5,268,962 | A | * | 12/1993 | Abadi et al. | 713/161 |
| 5,473,692 | A | * | 12/1995 | Davis | 705/59 |
| 5,481,720 | A | * | 1/1996 | Loucks et al. | 726/21 |
| 5,796,840 | A | * | 8/1998 | Davis | 705/51 |
| 5,812,671 | A | * | 9/1998 | Ross, Jr. | 713/153 |
| 5,832,514 | A | | 11/1998 | Norin et al. | |
| 5,852,666 | A | * | 12/1998 | Miller et al. | 713/167 |
| 5,892,900 | A | * | 4/1999 | Ginter et al. | 726/26 |
| 5,991,399 | A | * | 11/1999 | Graunke et al. | 380/279 |
| 6,009,456 | A | | 12/1999 | Frew et al. | |
| 6,016,393 | A | | 1/2000 | White et al. | |
| 6,055,562 | A | | 4/2000 | Devarakonda et al. | |

(Continued)

OTHER PUBLICATIONS

Authentication for distributed systems Woo, T.Y.C.; Lam, S.S.; Computer vol. 25, Issue 1, Jan. 1992 pp. 39-52 Digital Object Identifier 10.1109/2.108052.*

(Continued)

*Primary Examiner*—Emmanuel L Moise
*Assistant Examiner*—Techane J Gergiso
(74) *Attorney, Agent, or Firm*—Birch, Stewart, Kolasch & Birch, LLP

(57) ABSTRACT

In a distributed computing architecture, a method and system for authenticating a message as originating from an unaltered or unmodified node is provided. Prior to sending a messages, a black box software module in a node validates the node to determine whether the node has been altered or modified without authorization. Once validated, the black box alters a message, using a black box protection scheme, in such a manner that the message can be subsequently authenticated. The black box module sends the altered message to a peer node, whose own black box authenticates the message using an authentication scheme corresponding to the protection scheme. Because validation is performed, each node may assume that the message originated from an unaltered node. The protection and/or validation scheme can be changed in regular intervals so that attackers do not have time to reverse engineer the black box. Alternatively, validation may be skipped and the key used to alter/protect each message may be based on the environment of the node performing the alteration/protection, so that nodes that have been altered will generate different keys than unaltered nodes, and will not be able to communicate.

23 Claims, 6 Drawing Sheets

U.S. PATENT DOCUMENTS

| | | | |
|---|---|---|---|
| 6,065,039 | A | 5/2000 | Paciorek |
| 6,065,040 | A | 5/2000 | Mima et al. |
| 6,115,736 | A | 9/2000 | Devarakonda et al. |
| 6,134,580 | A | 10/2000 | Tahara et al. |
| 6,163,855 | A | 12/2000 | Shrivastava et al. |
| 6,181,795 | B1* | 1/2001 | Chandersekaran et al. .. 380/280 |
| 6,189,103 | B1* | 2/2001 | Nevarez et al. ................ 726/5 |
| 6,192,354 | B1 | 2/2001 | Bigus et al. |
| 6,233,601 | B1 | 5/2001 | Walsh |
| 6,282,563 | B1 | 8/2001 | Yamamoto et al. |
| 6,282,582 | B1 | 8/2001 | Oshima et al. |
| 6,330,588 | B1 | 12/2001 | Freeman |
| 6,334,146 | B1 | 12/2001 | Parasnis et al. |
| 6,532,543 | B1* | 3/2003 | Smith et al. .................... 726/14 |
| 6,560,707 | B2* | 5/2003 | Curtis et al. ................. 713/163 |
| 6,898,709 | B1* | 5/2005 | Teppler ...................... 713/178 |
| 6,918,038 | B1* | 7/2005 | Smith et al. .................... 726/22 |
| 7,177,426 | B1* | 2/2007 | Dube .......................... 380/46 |
| 7,181,017 | B1* | 2/2007 | Nagel et al. ................. 380/282 |
| 7,237,123 | B2* | 6/2007 | LeVine et al. ............... 713/193 |
| 2001/0037302 | A1* | 11/2001 | McFadzean et al. ........... 705/51 |
| 2002/0035698 | A1* | 3/2002 | Malan et al. ................. 713/201 |
| 2002/0059425 | A1* | 5/2002 | Belfiore et al. .............. 709/226 |
| 2002/0095603 | A1* | 7/2002 | Godwin et al. .............. 713/201 |
| 2002/0150251 | A1* | 10/2002 | Asano et al. ................. 380/277 |
| 2003/0072467 | A1* | 4/2003 | Brundage et al. ........... 382/100 |
| 2003/0144958 | A1* | 7/2003 | Liang et al. .................... 705/51 |
| 2004/0003235 | A1* | 1/2004 | Musa ......................... 713/155 |

OTHER PUBLICATIONS

Towards secure agent distribution and communication Korba, L.; System Sciences, 1999. HICSS-32. Proceedings of the 32nd Annual Hawaii International Conference on vol. Track8, Jan. 5-8, 1999 p. 10 pp. Digital Object Identifier 10.1109/HICSS.1999.773.*

Authentication for distributed systems Woo, T.Y.C. Lam, S.S. Texas Univ., Austin, TX, USA; This paper appears in: Computer Publication Date: Jan. 1992 vol. 25, Issue: 1 On pp. 39-52 ISSN: 0018-9162 CODEN: CPTRB4 INSPEC Accession No. 4113380 Digital Object Identifier: 10.1109/2.108052 Posted online: Aug. 6, 2002 18:06:14. 0.*

United Devices, Inc.™, printed from http://www.ud.com/home.htm, Apr. 24, 2002, 1 page.

Products: MetaProcessor™ platform version 2.1, printed from http://www.ud.com/products/mp_platform.htm, Apr. 24, 2002, 2 pages.

Projects: Cancer Research, printed from http://members.ud.com/projects/cancer/, Apr. 24, 2002, 1 page.

Grid computing—printed from http://searchwebservices.techtarget.com/sDefinition/0,,sid26_gci773157,00.html, May 21, 2002, 3 pages.

B. Rostamzadeh et al., "DACAPO: A Distributed Computer Architecture for Safety-Critical Control Applications", Intelligent Vehicles '95 Symposium, Sep. 25-26, 1995, p. 376-381.

J. Gosling, "The Feel of Java", IEEE Computer Society, Jun. 1997, pp. 53-57.

K. Minato et al., "Multipath Allocation Control in Communication Network Using Cooperative Distributed Multi-Agent Model", Denishi Joho Tsushin Gakkai, Nov. 1991, vol. J 74 B-1, No. 11, pp. 909-918.

L. Goldschlager, "A Universal Interconnection Pattern for Parallel Computers", Journal of the Association for Computing Machinery, vol. 29, No. 3, Jul. 1982, pp. 1073-1086.

E. Krieger et al., *Models@Home: distributed computing in bioinformatics using a screensaver based approach*, Oxford University Press, Feb. 2002, vol. 18, No. 2, pp. 315-318.

D. Liang et al., "A fault-tolerant object service on CORBA", The Journal of Systems and Software, vol. 48, No. 3, Nov. 1999, pp. 197-211.

W. Reisig, "Distributed Algorithms: Modeling and Analysis with Petri Nets", IEEE International Conference on Systems, Man, And Cybernetics, vol. 1, 1998, pp. 38-43.

T. Mudge, "A Computer Architecture For Parallel Processing", University of Michigan, p. 596.

M. Portmann et al., "The Cost of Peer Discovery and Searching in the Gnutella Peer-to-peer File Sharing Protocol", IEEE, 2001, pp. 263-268.

N. Eng et al., "An Initial Approach of a Scalable Multicast-based Pure Peer-to-Peer System", IEEE Proceedings of the First International Conference on Peer-to-Peer Computing, Aug. 27, 2001, pp. 97-98.

A. Loo et al., "A peer-to-peer distributed selection algorithm for the Internet", Internet Research: Electronic Networking Applications and Policy, vol. 12, No. 1, 2002, pp. 16-30.

C. J. Anumba et al., "Collaborative design of structures using intelligent agents", Automation in Construction, 2002, pp. 89-103.

B. Boutsinas et al., "On distributing the clustering process", Pattern Recognition Letters, vol. 23, No. 8, 2002, pp. 999-1008.

\* cited by examiner

PREVENTION OF SOFTWARE TAMPERING

FIELD OF THE INVENTION

The invention generally relates to computing systems and architectures. More specifically, the invention relates to authenticating nodes in a distributed computing architecture and ensuring that intercommunicating software nodes have not been altered or modified without authorization.

BACKGROUND OF THE INVENTION

Distributed computing systems are generally known in the art. However, known distributed computing systems such as grid computing systems typically divide a single large computing task into sub-tasks, and each participant in the grid computing system performs or solves the sub-task that it was given. In addition, each distributed computer generally only works on its assigned sub-task when its processor or other resources necessary to the sub-task would otherwise be idle. Also, each distributed computer node is required to trust a central authority to execute code on the node's machine with little control over what that code is able to do.

For example, one known distributed computing system is the Intel-United Devices Cancer Research Project sponsored by United Devices, Inc. of Austin, Tex. and Intel Corporation of Santa Clara, Calif. The Cancer Research Project allows PC owners to volunteer idle processor time on their own computers to help find a cure for cancer. Each user downloads a software client that periodically receives a research sub-task from a server, and performs the sub-task when the local computer processor would otherwise be idle. Upon completion of the sub-task, the local client sends the results to the server, and receives a new sub-task. At all times the local client is dependent on the central server that divides the task into sub-tasks and assigns sub-tasks to volunteer client machines. In addition, each client does not contribute to the computing space except that the client performs an assigned sub-task. That is, each client only executes sub-tasks defined by the server; each client is not capable of executing any arbitrary application program. Finally, the nodes must rely on United Devices to ensure that code or data coming from the server will execute in a manner that will not harm other components of the machine, such as data on the hard drive. This known system is bounded by the ability of the central server to assign sub-tasks to each of the nodes for processing.

Another known pseudo-distributed computing space is demonstrated by online roll-playing games such as Ultima Online®. In an online roll-playing game (RPG), each remote user typically must log in to a central server that administers and oversees the game play of the RPG. The virtual world in which characters live is defined by and maintained by the central server, and appears identical to each remote client (player characters) connected to that central server. In addition, all interaction between players goes through the central server. Thus, while online RPGs may be thought of as distributed computing environments, they are in fact large client-server applications.

In both of the above-described environments, the system can be disrupted by a client machine whose local client software has been altered. In addition, there is a potential that an attacker can inject malicious software onto a computer or into the networked environment by altering or modifying the client software on one or more nodes in the distributed system. For example, if a client application performing cancer research is altered by an end-user, the client may return incorrect research results to the server, or may be able to break into the server and determine locations of other client machines, which it may then attack. If a client application in the online RPG is altered, an end-user may be allowed to cheat or otherwise disrupt game play.

Known virus protection software only provides a limited defense against such attacks because virus protection software typically protects only against external attackers. That is, virus protection software does not protect against an end-user modifying his or her own client software and injecting malicious code or messages into a networked environment. Instead, virus protection software only protects against incoming viruses and the like.

Thus, it would be an advancement in the art to be able to ensure that, in a networked environment, client software on a node has not been altered. It would be a further advancement in the art to ensure that communications received by one node in a network did not originate from another node in the network whose network client software has been altered or modified without authorization.

BRIEF SUMMARY OF THE INVENTION

The inventive method and system overcome the problems of the prior art by using a black box module to validate a node prior to sending a message to another peer node. The black box may validate the node to determine that the node has not been altered or modified without authorization. Once validated, the black box injects authentication credentials into the message and sends the validated and protected message to a peer node. Because validation is performed, each node may assume that any received protected message originated from an unaltered node. The protection or validation scheme can be changed in synchronized intervals so that attackers do not have time to reverse engineer the validation and/or protection scheme.

Alternatively, validation may be skipped and the key from which protection of each message is based may be generated based on the environment of the node performing the encryption, so that nodes that have been altered will generate different protection keys than unaltered nodes. Thus, altered and unaltered nodes will not be able to communicate.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

Aspects of the present invention provide prevention and detection mechanisms to ensure that client software in a networked environment have not been altered without authorization. One or more aspects of the invention are applicable to any general purpose computing platform capable of running a variety of operating systems, virtual machines, and applications, including PCs running WINDOWS®, LINUX®, MacOS®, or SOLARIS® brand operating systems and the like, as well as PDA devices, Tablet PCs, pen-based computers, and other data processing systems.

Figure 1:
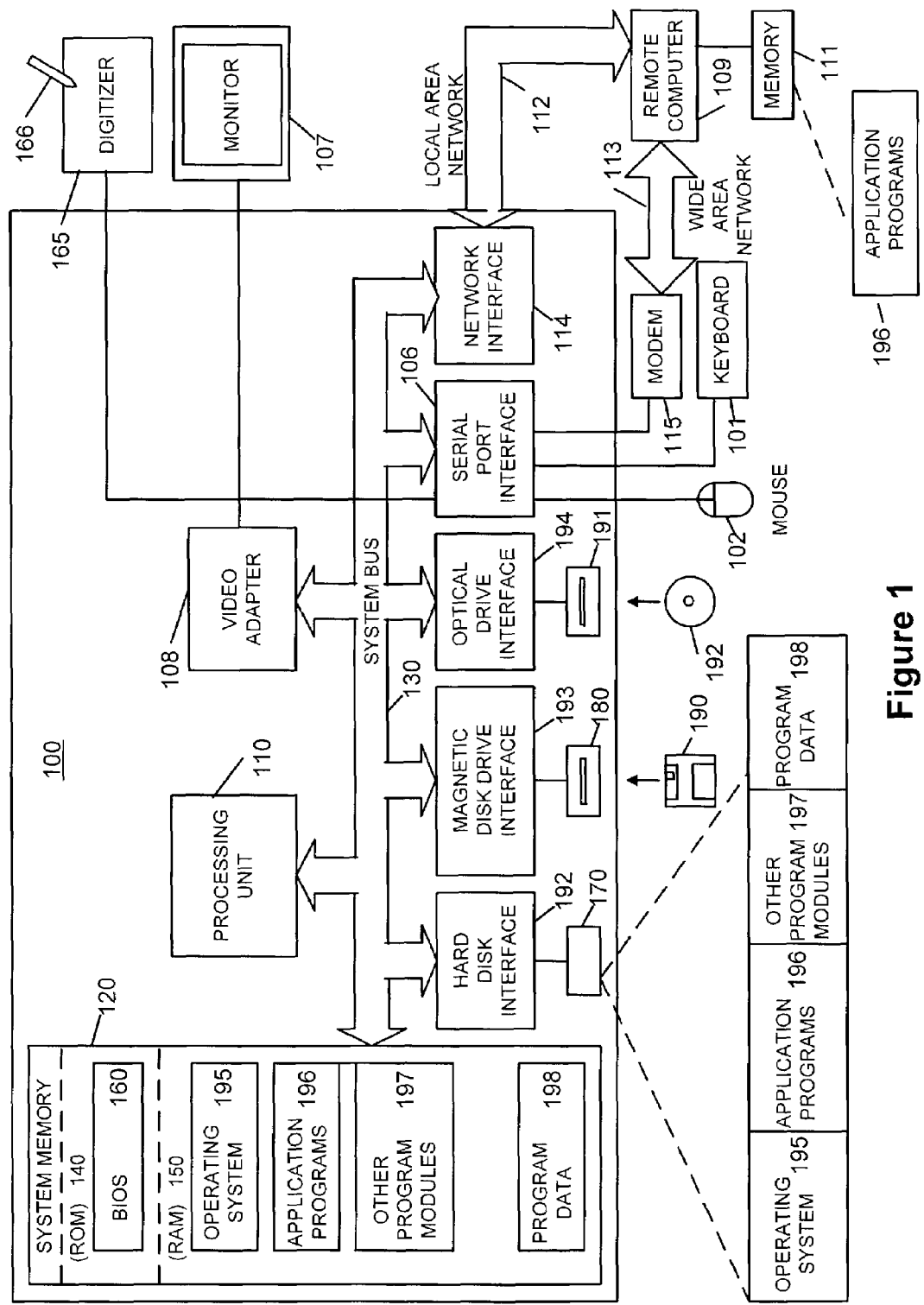
FIG. 1 illustrates a schematic diagram of an exemplary general-purpose digital computing environment that may be used to implement various aspects of the present invention.

FIG. 1 illustrates a schematic diagram of an exemplary conventional general-purpose digital computing environment that may be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules, and other data for the personal computer 100. It will be appreciated by those skilled in the art that other types of computer readable media that may store data that is accessible by a computer, such as magnetic cassettes, flash memory cards, digital video disks, Bernoulli cartridges, random access memories (RAMs), read only memories (ROMs), and the like, may also be used in the example operating environment. It will also be appreciated that one or more aspects of the invention may be implemented using software, hardware, or a combination of the two.

A number of program modules may be stored on the hard disk drive 170, magnetic disk 190, optical disk 192, ROM 140, or RAM 150, including an operating system 195, one or more application programs 196, other program modules 197, and program data 198. A user may enter commands and information into the computer 100 through input devices, such as a keyboard 101 and a pointing device 102. Other input devices (not shown) may include a microphone, joystick, game pad, satellite dish, scanner, or the like. These and other input devices often are connected to the processing unit 110 through a serial port interface 106 that is coupled to the system bus 130, but may be connected by other interfaces, such as a parallel port, game port, or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor 107, personal computers typically include other peripheral output devices (not shown), such as speakers and printers. As one example, a pen digitizer 165 and accompanying pen or user input device 166 are provided in order to digitally capture freehand input. The pen digitizer 165 may be coupled to the processing unit 110 via the serial port interface 106 and the system bus 130, as shown in FIG. 1, or through any other suitable connection. Furthermore, although the digitizer 165 is shown apart from the monitor 107, the usable input area of the digitizer 165 may be co-extensive with the display area of the monitor 107. Further still, the digitizer 165 may be integrated in the monitor 107, or may exist as a separate device overlaying or otherwise appended to the monitor 107.

The computer 100 may operate in a networked environment using logical connections to one or more remote computers, such as a remote computer 109. The remote computer 109 may be a server, a router, a network PC, a peer device, or other common network node, and typically includes many or all of the elements described above relative to the computer 100, although only a memory storage device 111 with related applications programs 196 have been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet.

When used in a LAN networking environment, the computer 100 is connected to the local network 112 through a network interface or adapter 114. When used in a WAN networking environment, the personal computer 100 typically includes a modem 115 or other means for establishing a communications link over the wide area network 113, e.g., to the Internet. The modem 115, which may be internal or external, is connected to the system bus 130 via the serial port interface 106. In a networked environment, program modules depicted relative to the personal computer 100, or portions thereof, may be stored in a remote memory storage device.

It will be appreciated that the network connections shown are exemplary and other techniques for establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Figure 2:
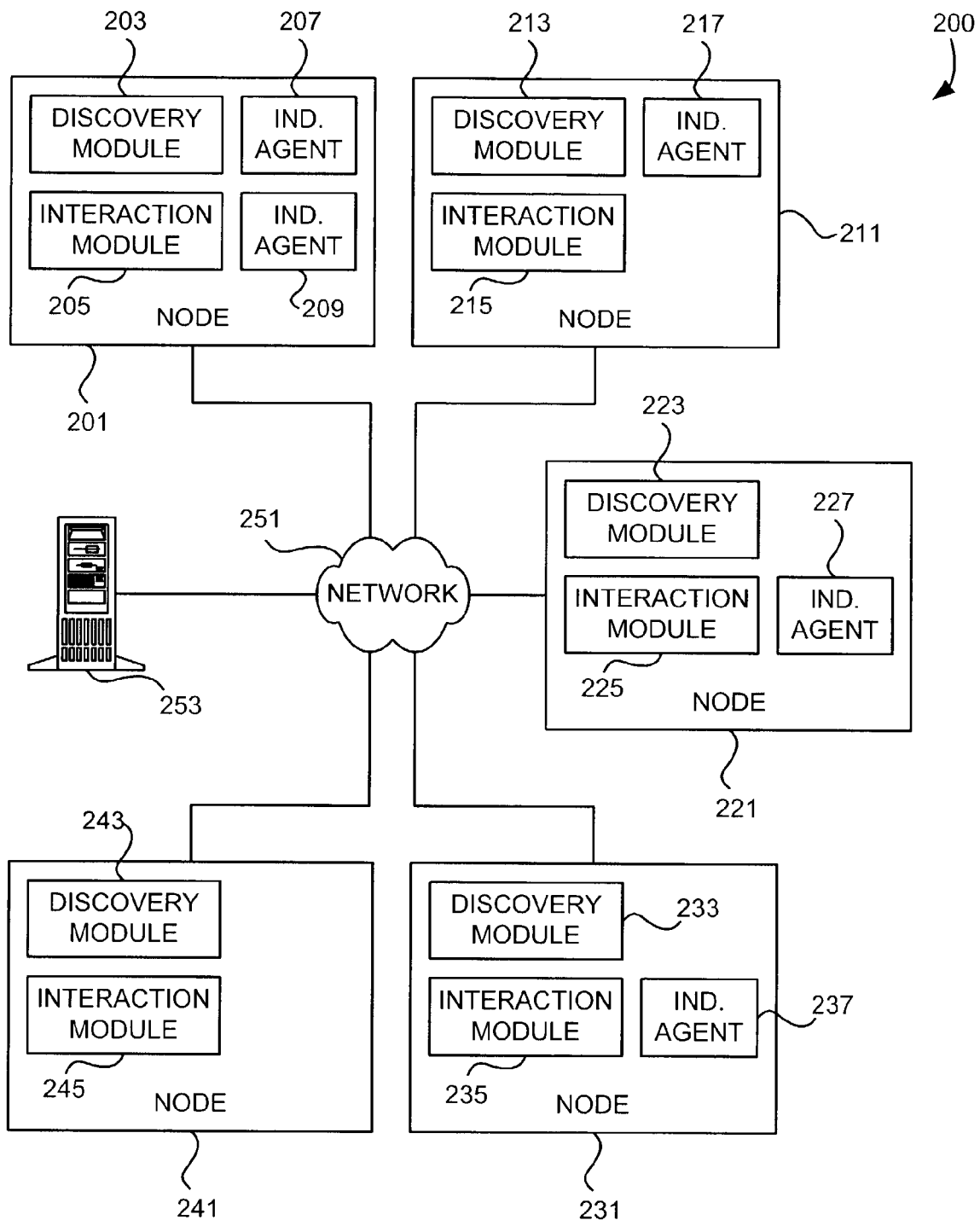
FIG. 2 illustrates a schematic diagram of a network of independent processing nodes communicating via a network according to an illustrative embodiment of the invention.

With reference to FIG. 2, a symmetric multi-processing unbounded computing space can be created by leveraging idle processing time on networked computers, combined with sufficient security and sandbox mechanisms to allow execution of code from potentially untrusted sources. Each node in the computing space may have a detection mechanism to discover other nodes in the computing space. As a result, new nodes may by dynamically added and removed without being required to register with a central server, and any user can introduce executable code into the computing space.

An unbounded computing space (UCS) 200 includes one or more independent nodes 201, 211, 221, 231, 241. Each node that is a part of the UCS 200 provides an environment in which software programs, referred to as independent agents, can run. That is, each node acts as an execution shell for independent agents. In addition, because each node added to UCS 200 may have a different configuration from the other nodes (e.g., varying software, resources, security policy, hardware, attached peripheral devices, etc.), each node provides a unique computing space. Thus, two different nodes executing the same independent agent may yield different results.

Each node in the unbounded computing space may be thought of similar to a plot of land, with unique characteristics, that executes independent agents received from other nodes within the UCS. Thus, as each node is added to the UCS 200, e.g., by launching node application software, the environment in which independent agents can run increases. Likewise, as nodes are removed from the UCS 200 (e.g., as a result of a user closing the node application program executing on a computer system), the environment in which independent agents can run decreases.

The individual nodes that make up the unbounded computing space might not be dependent on a server for the receipt of independent agent software modules. That is, each node in the unbounded computing space can introduce an independent agent, which may subsequently be copied or transferred to another node within the unbounded computing space.

A node 201 in unbounded computing space 200 includes a discovery module 203 and interaction module 205, and often (but not always) includes one or more independent agents 207, 209. Node 201 calls discovery module 203 to detect other nodes within the unbounded computing space, and calls interaction module 205 to interact with the other detected nodes, e.g., by sending an independent agent to another node. As stated above, independent agent 207, 209 is a code assembly that uses the interaction module to travel to and execute on another node or nodes within the unbounded computing space to perform a function. Independent agents can be transported or copied from one node to another, optionally maintaining state information between nodes. It is also possible that an agent does not travel from one node to another, and instead executes only in the node in which it was introduced.

Unbounded computing space 200 may also include additional nodes 211, 221, 231, 241, with respective discovery modules 213, 223, 233, 243, interaction modules 215, 225, 235, 245, and independent agents 217, 227, 237. Nodes, generally, are embodied in computer systems interconnected via a network 251 such as the Internet, a LAN, WAN, intranet, etc. Each node may vary in composition from system to system, provided each node can understand the other nodes within the unbounded computing space, e.g., by using a common communication protocol. That is, each node can use a unique algorithm to create and define a computing space that is represented by the node.

Figure 3:
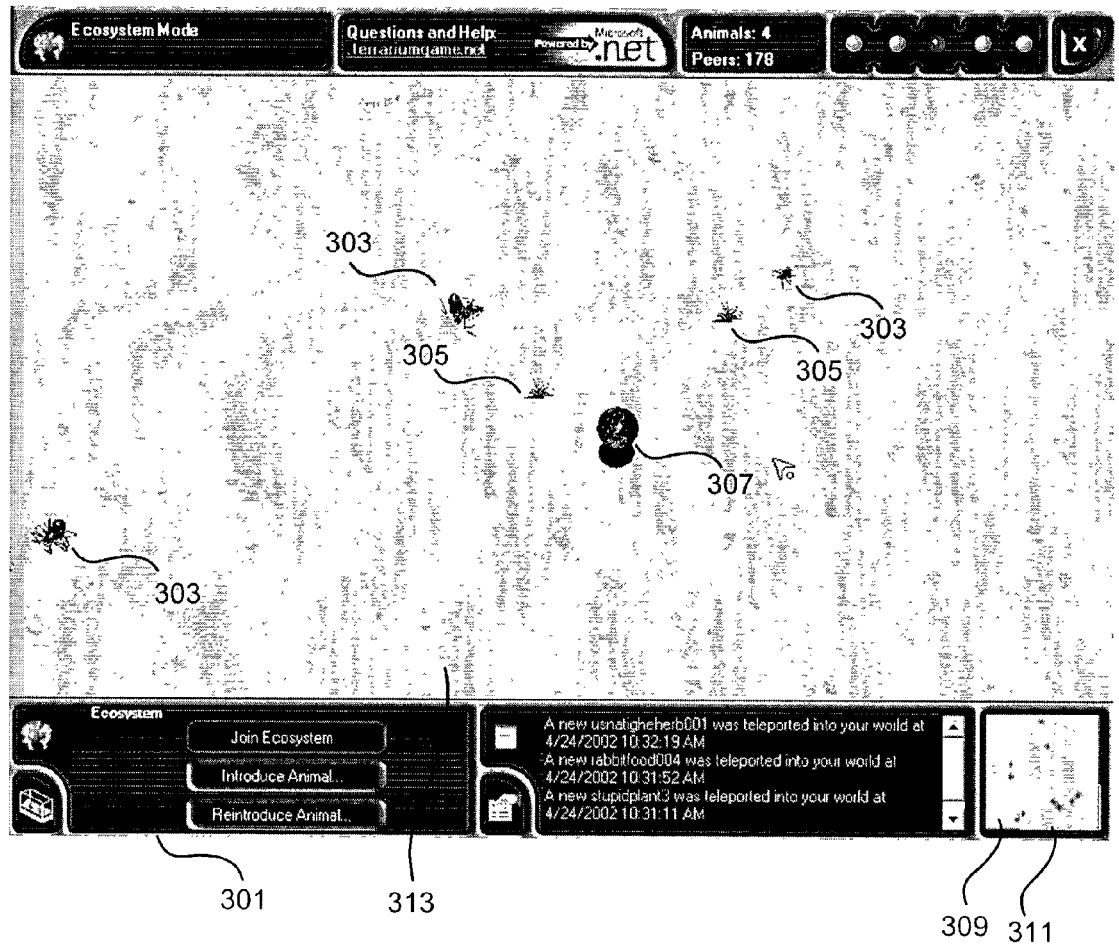
FIG. 3 illustrates a screenshot of a user interface for an independently processing peer used as an unbounded gaming application according to an illustrative embodiment of the invention.

In one illustrative example, with reference to FIG. 3, nodes may represent physical terrain in a virtual world. FIG. 3 illustrates a user interface for a terrain node 301 that is part of an unbounded computing space that interacts to play a game. Each independent agent 303, 305 may represent an animal or plant that lives and grows (and potentially dies) on the terrain in the virtual world, and that may be transported from one terrain node to another terrain node. Another independent agent 307 might execute only on the terrain node on which it is initially introduced and launched. In this example, independent agent 307 represents a sphere that randomly travels around the terrain of its local terrain node and, upon hitting an independent agent representing an animal or plant, causes the local terrain node to "teleport" the animal or plant to another random terrain node within the unbounded computing space by copying the independent agent to another terrain node along with the current state information of the independent agent. FIG. 3 illustrates only a portion of the terrain of the terrain node 301. Map 309 illustrates the entire terrain located on terrain node 301, and box 311 indicates the visible portion shown in window 313.

In another example, each node may be defined to allow diagnostic functions to execute on the computer system on which each node is located. That is, an independent agent may perform a diagnostic service on the computer system on which the node is located. For example, an independent agent named Defragger, upon being introduced on or copied to a diagnostic node, may check to determine a fragmentation level of one or more local hard drives. When the fragmentation level is above a predefined threshold, Defragger may launch a defragmentation utility on the local computer to defragment the identified hard drive. Similarly, an independent agent named SpaceMaker, upon being introduced on or copied to a diagnostic node, may check to determine how much space is available on the local hard drives of the computer on which the diagnostic node is located. When the amount of available space is below a predefined amount (or percentage of total space available), SpaceMaker may automatically (optionally upon confirmation by a user) delete files known not to be needed, such as temporary files, cache files, and the like.

As is illustrated above, because each node can use a different algorithm, each node can serve a different purpose than other nodes, and can allow different tasks than other nodes allow. In one illustrative embodiment, nodes of differing types communicate with each other in a global unbounded computing space, e.g., through the use of a common port on each computer system. Before sending an independent agent from one node to another, the nodes may communicate to determine whether the independent agent is compatible with the node to which it is being sent (e.g., an independent agent of the animal type illustrated above cannot successfully run on a diagnostic node). When a node of one type sends an agent meant for execution on a node of a second type, the receiving node may still execute the agent in order to read parameter information associated with the agent. Upon detecting that the agent is meant for another type of node, the receiving node may stop execution of the agent.

In an alternative illustrative embodiment, unbounded computing spaces of different types are kept separate, and nodes of one type are unaware of and do not communicate with nodes of another type. In this illustrative embodiment, communications may be kept separate through the use of separate ports on a machine, or any other known technique. For example, a machine identified by IP address 1.2.3.5 may have a terrain node accessible at 1.2.3.5:50000, while a diagnostic node on the same machine may be accessible at 1.2.3.5:50001.

Each node may include parameter definitions that vary from node to node, e.g., indicating the node's type, terrain size and definition (when applicable), types of agents allowed, number of independent agents that can execute simultaneously, and the like. Each node also provides security so that independent agents cannot perform malicious acts on the node's local computer system. The security parameters and controls may be stored in a security module that executes in or as part of the node module. In one illustrative embodiment, each node is executed in a managed code environment, such as Common Language Runtime (CLR) and the .NET framework, or Java Virtual Machine. Any managed code environment providing similar security mechanisms may alternatively be used.

Running each node in a managed code environment allows each node to use the environment's security policy measures to sandbox independent agents (i.e., restrict independent agents from performing malicious acts on the computer system). That is, each node can define a security policy in such a manner so as to allow independent agents to perform only non-malicious acts when executing on the local computer system, based on a predefined security policy manager provided by the managed code environment. The security policy may be defined on a per-agent basis (i.e., each independent agent may have a differing security policy), may be defined on a group basis (i.e., each agent belonging to a specified group has the same security policy), or may be defined globally (i.e., all independent agents have the same security policy). Using the various security policy definition levels, a node can provide one or more security policies to one or more independent agents, including independent agents unknown at the time the security policy is defined.

With reference back to FIG. 2, each node 201, 211, 221, 231, 241 includes a discovery module 203, 213, 223, 233, 243, respectively. The discovery module can detect other nodes that are a part of the unbounded computing space, and may also maintain a list of other nodes that are available to receive an independent agent.

In one illustrative embodiment, each discovery module may communicate with a central server 253 that maintains a list of active nodes in the unbounded computing space 200. Each new node, upon initialization, may register with the server 253 and obtain a list of active nodes within the unbounded computing space 200. Each node may subsequently receive an updated list of active nodes in predetermined intervals (e.g., every 2 minutes, 5 minutes, 15 minutes, etc.).

In another illustrative embodiment, no central server is used. Instead, a peer-to-peer detection scheme may be used to discover other nodes. In this embodiment, a node 201 may broadcast an undirected discovery request over the network 251, e.g., by sending a network broadcast specifying a specific HTTP port without specifying a specific recipient, as is generally known in the art. When another node, e.g., node 211, receives the broadcast, it sends a response to the broadcasting node 201 indicating its presence in the unbounded computing space. Once the broadcasting node 201 receives the response, it can determine the network address of the other node 211, and can communicate with node 211 to learn about still other nodes of which node 211 is aware, e.g., nodes 221, 231, and/or 241. This process can be repeated until node 201 is either aware of every node in the UCS 200, or is aware of at least a predetermined number or percentage of nodes in the UCS 200, as defined by the detection module.

Each node also includes an interaction module that coordinates communication and independent agent transmissions among nodes. The interaction module defines the common way in which each node communicates with other nodes by defining an information passing protocol that is used throughout the unbounded computing space, as well as an agent passing protocol that is used to transfer independent agents from one node to another. In an alternative embodiment, information and agent passing may be performed by a single protocol.

The information passing protocol is used to pass environment information from one node to another. Environment information may include information such as runtime version, knowledge of certain types of independent agents, and the like. Knowledge of a certain independent agent may be useful because if node 201 is already storing a copy of a specific independent agent, e.g., the SpaceMaker independent agent, then there is no need for another node 211 to duplicatively send another copy. Instead, when node 211 informs node 201 that node 211 is going to send the SpaceMaker independent agent, node 201 indicates to node 211 that node 201 is already aware of the SpaceMaker independent agent, authenticates the preexisting copy of the SpaceMaker independent agent, and executes the preexisting copy of the SpaceMaker independent agent when authenticated successfully.

In one illustrative embodiment of the invention, the interaction module uses a hypertext transport protocol (HTTP) server to perform information and agent passing among nodes via extensible markup language (XML) messages. The interaction module may use the HTTP POST feature to upload an independent agent from one node to another, e.g., by using a specific port identifier. One of skill in the art will appreciate that other communications protocols may be used for node communications and independent agent transmissions. For example, an interaction module may alternatively use a TCP (Transmission Control Protocol) connection between peers in combination with the serialization mechanism provided in Common Language Runtime (CLR) to exchange information between nodes. In yet another embodiment an independent agent may be stored on a removable disk (e.g., a floppy disk), which is transported to another computer system acting as a node, and the independent agent is loaded from the removable disk. Any other protocol that provides a standard way to exchange information and code can alternatively be used. Preferably, the selected protocol should understand and account for evolving nodes. That is, the protocol should (but is not required to) communicate with older nodes that do not necessarily include all the functions of the latest node software.

Figure 4:
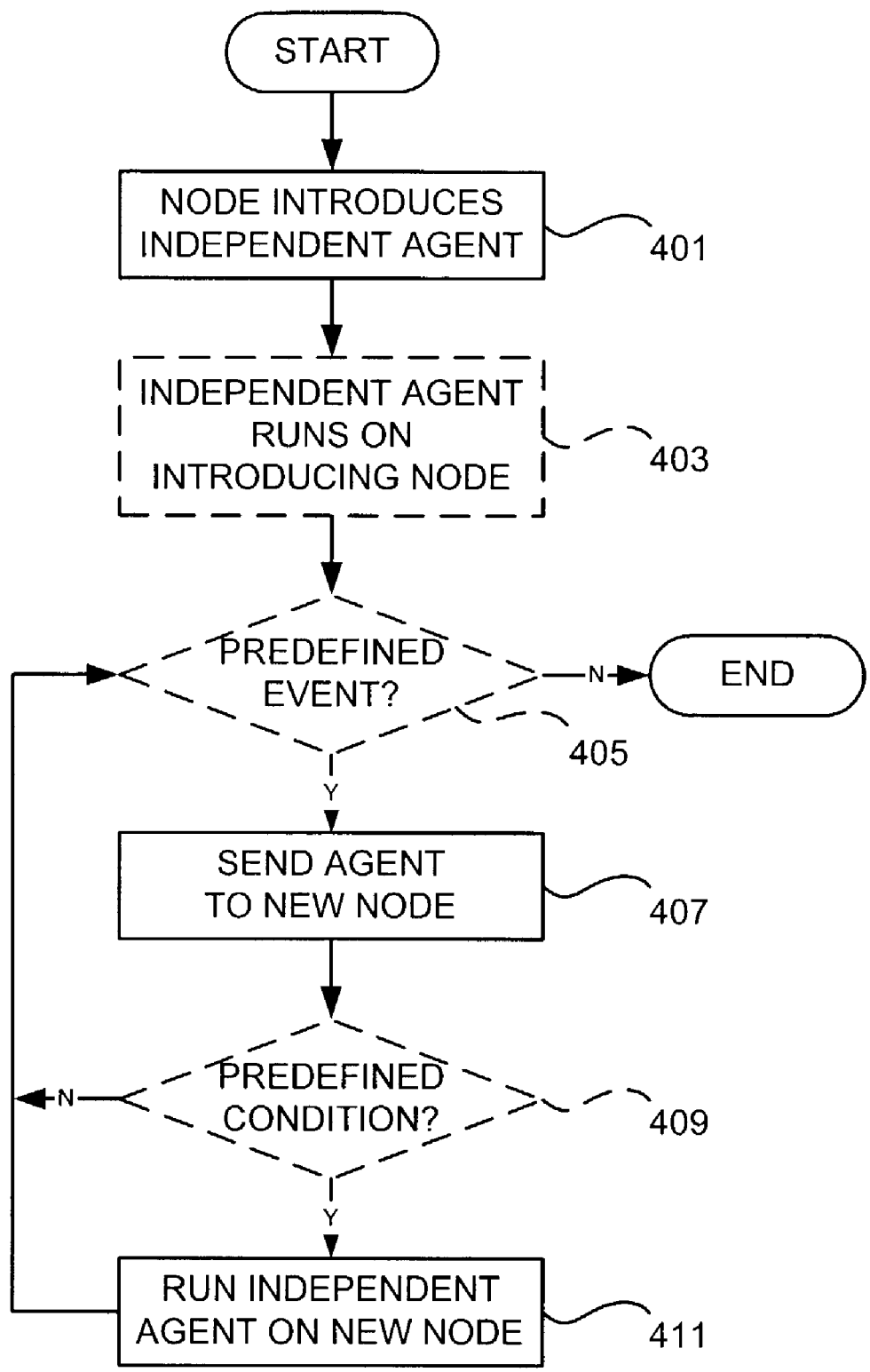
FIG. 4 illustrates a method for executing an independent agent in a network of independent processing nodes according to an illustrative embodiment of the invention.

With reference to FIG. 4, using the above-described unbounded computing space, any node can introduce an independent agent that can potentially run on any other node within the unbounded computing space. In step 401, an introducing node, e.g., node 201 in FIG. 2, introduces an independent agent. Node 201 may introduce the independent agent by loading the independent agent within the execution environment defined by node 201. Optionally, in step 403, node 201 executes the introduced independent agent. In step 405, also optional, node 201 may wait for a predefined event to occur, prior to sending or copying the independent agent to a new node in step 407. If the predefined event never occurs, the independent agent might not be transferred to another new node. The predefined event may be the occurrence of any event or the satisfaction of any condition as defined by a user or program. For example, the predefined event may be as simple as the satisfaction of the condition that there is another node in the computing space in which the independent agent has not yet been run, and the present node may send the independent agent to that node in step 407. That is, the independent agent may store historical data regarding nodes which the agent has visited and/or which have executed the agent. The present node may compare the historical data to the present node's list of other nodes of which it is aware, and the present node may send the independent agent to a node of which it is aware that the agent has not yet visited and/or on which the agent has been executed.

As another example, the predefined event may be the occurrence of an event, such as a local process independently determining that the independent agent should be sent to a new node, e.g., independent agent 307 "hitting" a plant or animal independent agent as illustrated above. Alternatively, node 201 may send the independent agent to a new node in step 407 without waiting for a predefined event, or may select a node at random to which the independent agent is sent.

In step 407, node 201 sends a copy of the independent agent to a new node, e.g., node 211. Node 201 may or may not delete its local copy of the independent agent. Node 201 may or may not include the independent agent's state information when sending to node 211, depending on the design and purpose of the independent agent. If the agent is being "teleported" from one node to another, state information may be included. However, if the agent is performing diagnostic services, state information might not be included so that the independent agent can start from a newly initialized state on each node. Alternatively, some state information may be copied from one node to another in order to track and keep a historical record of the activities of the independent agent (e.g., number of nodes on which it has executed, age since creation, average fragmentation of hard drives, and other statistical and descriptive information).

In step 409, the node receiving the independent agent optionally checks for the presence of or waits for a predefined condition to occur in step 409 prior to running the independent agent in step 411. The predefined condition may include any user or program defined condition, such as hard drive fragmentation above a certain threshold, available hard drive space below a certain threshold, and the like. The predefined condition may be provided by either the agent itself or the node to which it was sent. After running the independent agent in step 411, the present node (node 211) may return to step 405 and wait or check for the predefined event associated with that independent agent (or a different predefine event), or may skip step 405 and continue immediately to step 407 and send the independent agent to yet another node (e.g., back to node 201, or to a new node 221, 231, 241).

While the invention has been primarily described as an unbounded computer space, in an alternative illustrative embodiment a grid computing architecture can be modified to allow any person (or machine), even an untrusted person (or machine), to introduce programs into the computing space. Each node in the grid computing architecture can use CLR code access security, or any similar security model, to safely execute software, including software submitted by an untrusted party.

Using any of the above-described models, e.g., the unbounded computing space or modified grid computing architecture, work can be performed in a distributed manner without using a central server to coordinate each task. For example, when a user or program determines that a primary task could be performed more quickly if the primary task were distributed among multiple computers, the user (or program) may create an independent agent that, when introduced at a node, coordinates the performance of the task across one or more systems in the entire computing space (e.g., by sending independent agents containing sub-tasks to other nodes). That is, the unbounded computing space acts as a "supercomputer" by treating each node in the unbounded computing space as a processor, and allowing users to submit programs that can run independent but coordinated tasks on several of the nodes. Any user (even untrusted users) can submit programs for execution on the supercomputer, e.g., programs that get more accurate or more detailed with more processors. For example, a user may submit an independent agent that models traffic, and each node computer behaves like an automobile. Adding more nodes to the unbounded computing space allows the agent to model a larger road as a result of having more "cars" to work with.

In an illustrative embodiment, a primary independent agent introduced in a coordinating node may generate derivative independent agents that, when sent to other nodes, each performs a sub-task of the primary task, or each equally interact to accomplish a joint task. The original independent agent or the derivative independent agents may be programmed to check for predetermined criteria prior to sending one of the derivative independent agents to another node. For example, an agent may check to determine that the other node's processor utilization level is below a predetermined threshold to ensure that the derivative agent will not interfere with other programs executing on the other node, or an agent may check to verify that the other node has a specific resource that is required in order to complete the sub-task. Thus, any node in the unbounded computing space (or modified grid computing architecture) can dynamically act as a coordinator for a given task performed or distributed across the system, without requiring that the coordinating node has any special central authority or privileges, because each node in the system ensures that agent programs do not perform malicious behavior as defined by each node's security policy. Each node that performs the task (or a portion of the task) may send results back to the coordinating node, as specified by the derivative independent agent(s) sent to the other nodes.

Regardless of the security mechanism used as described above, attackers are known to go to great lengths to reverse engineer security mechanisms. Given enough time and resources, virtually every security mechanism can be reverse engineered. Thus, in an illustrative embodiment of the invention, each node may include a black box module ("black box") that validates a node and/or protects messages prior to sending them to other nodes to prevent and detect when the host node software has been tampered with. To prevent reverse engineering of the black box itself, a new black box may be distributed over the network at regular or irregular intervals, in a synchronized manner across the network. Using the black box, every important message from one peer to another may be protected and/or encrypted using a predetermined function in the black box. Because each peer runs the same black box, a receiving peer may use an authentication and/or decryption function in the same black box assembly to authenticate and/or decrypt the message for further processing.

Figure 5B:
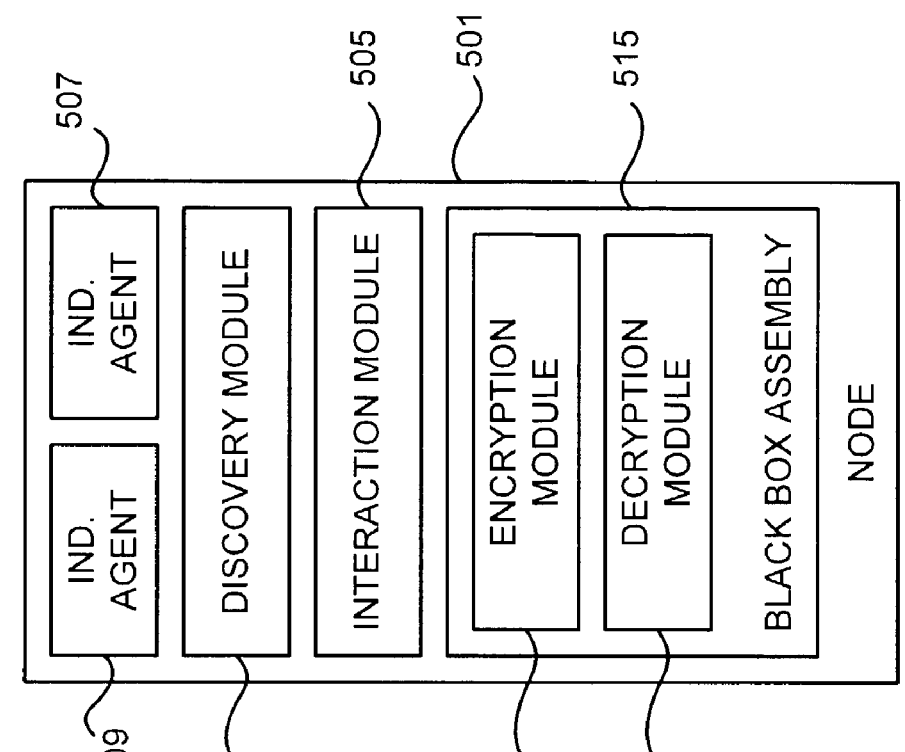
FIG. 5B illustrates a schematic diagram of a network node adapted to prevent and detect software tampering according to another illustrative embodiment of the invention.
Figure 5A:
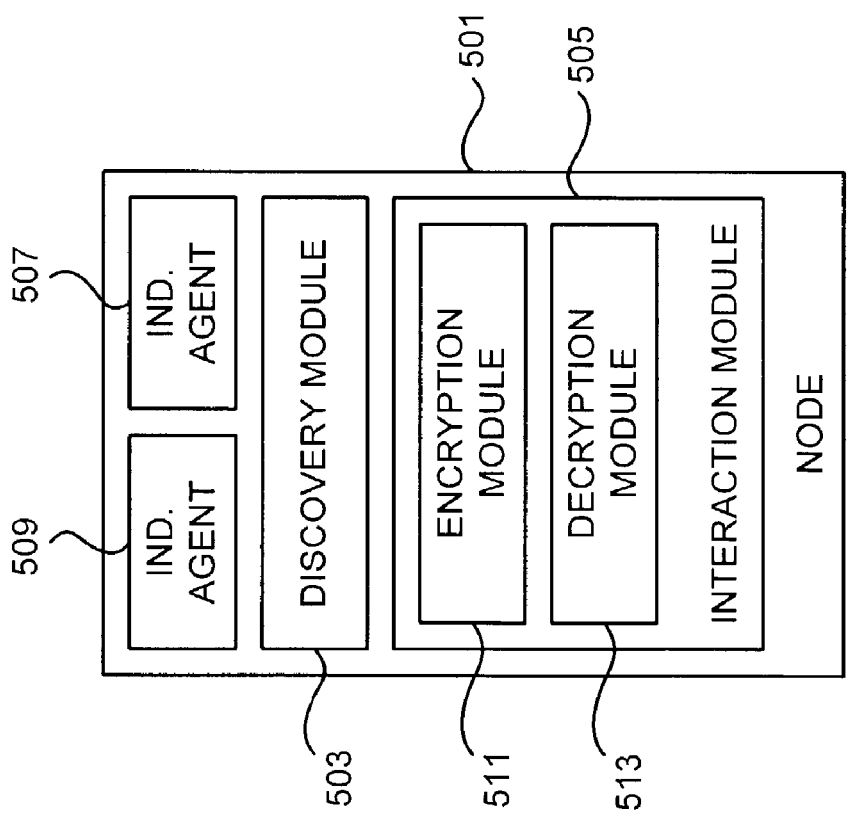
FIG. 5A illustrates a schematic diagram of a network node adapted to prevent and detect software tampering according to an illustrative embodiment of the invention.

FIG. 5A illustrates a node 501 having a discovery module 503, interaction module 505, and independent agents 507, 509, as described above. In the present embodiment, node 501 also includes an encryption module 511 and decryption module 513 for detecting and preventing an attacker from modifying the software code used to implement the host node. Modules 511 and 513 together may be referred to as a black box that verifies that the host node software has not been modified and performs encryption/decryption (or other protection technique as described below) for communicating with other nodes. In an alternative illustrative embodiment, encryption module 511 and decryption module 513 might not be part of the interaction module. Instead, encryption module 511 and decryption module 513 together may make up a separate black box module 515 in node 501 as illustrated in FIG. 5B. In still another alternative illustrative embodiment, encryption module 511 and decryption module 513 individually may make up a two additional modules in node 501 (not shown). In still another embodiment, there may be a validation module (not shown) that validates the node prior to module 511 protecting the message. While the encryption/decryption are used in an illustrative embodiment, other authentication schemes may alternatively be used. In such embodiments, module 511 may be referred to as a protection module and module 513 may be referred to as an authentication module.

Figure 6:
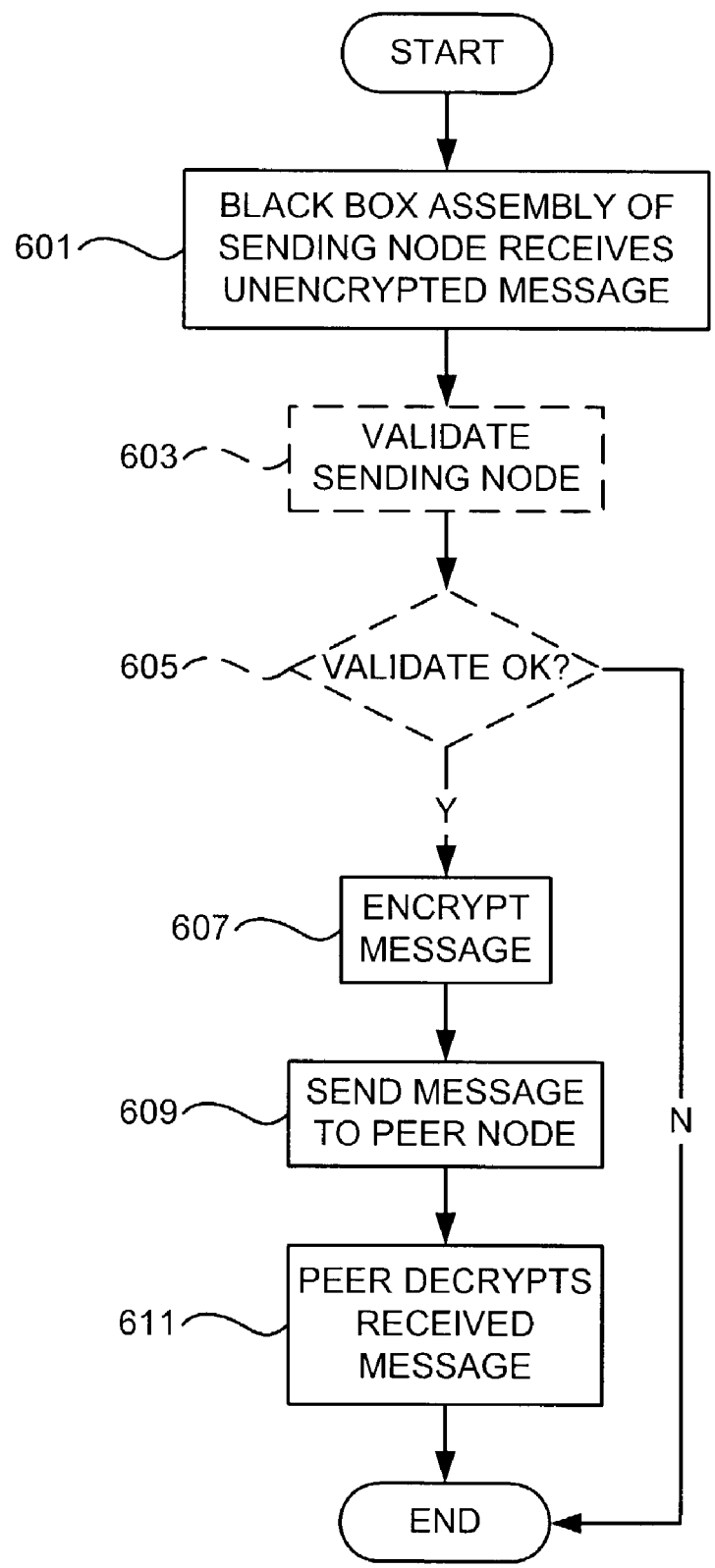
FIG. 6 illustrates a method for preventing and detecting software tampering according to an illustrative embodiment of the invention.

FIG. 6 illustrates a method for preventing and detecting software tampering according to an illustrative embodiment of the invention. When a node determines that a message being sent to another node should be encrypted, the sending node may call black box 515, which may be a common language runtime (CLR) dynamic link library (DLL). The DLL may have one class, message_contents, and have two methods on the class, Protect(message_contents) and Authenticate(message_contents). The Protect method may accept as input the message to be protected, and output the encrypted message (or other message output with authentication credentials) or an error code (e.g., when validation fails), as described below. The Authenticate method may accept as input a received encrypted message and output a decrypted message or an error code (e.g., when decryption is unsuccessful). Thus, in step 601, the black box assembly 515 may receive the initial unencrypted message through a call to Protect(message_contents).

In optional steps 603 and 605, prior to actually encrypting the message, black box assembly 515 may validate the node that intends to send the message, i.e., the sending node, to ensure that the sending node has not been altered without authorization. The black box assembly 515 validates the sending node and, if the sending node does not validate correctly, black box assembly 515 may terminate the encryption process. If the sending node is validated ok, black box assembly 515 continues to step 607.

Validation may be performed by comparing a piece (or pieces) of node specific information to an expected value for that piece (or pieces) of information. For example, validation may be performed by examining the executable image in memory of the sending node and comparing predetermined bytes to known expected values. Environment variables may also be used to validate the node. Alternatively, validation may be performed by examining the file size of the sending node's executable file (i.e., the node software). Still alternatively, the black box assembly may validate the node by calling predetermined functions that are likely targets for malicious code or which an attacker would likely modify, and determine whether the function(s) behave properly when executed with test data.

The specific validation technique used may depend on specific design considerations and implementation details of each specific network environment using the black box modules. Preferably, validation includes using multiple heuristics to examine predefined data structures to confirm that each data structure falls within a range defined as normal. Additionally, validation may include an examination of state transitions to determine whether each state transition is possible given the logic of the software. One of skill in the art will appreciate that other known validation technique may alternatively be used, whether now known or later developed.

In step 607 the black box assembly encrypts the message so that the sending node can send the encrypted message to another node over a network such as the Internet (any network may be used). The encryption algorithm may include any symmetric encryption algorithm, such as DES, 3DES, AES, Blowfish and the like. The specific type of encryption used is secondary to the encryption method's resilience against attack for the lifetime of the black box and the method being consistent across all the parties (i.e., nodes). One of skill in the art will appreciate that alternative methods of protection may be used. For example, each message may alternatively be hashed, watermarked or otherwise given authentication credentials. In one alternative illustrative embodiment, an asymmetric encryption key may be encrypted using a symmetric key and included in the message sent to the other node.

In one illustrative embodiment of the invention, the encryption key used to encrypt the message is static, but changes each time a new black box is distributed over a network (described below). In such an embodiment, steps 603 and 605, above, should be used. In an alternative illustrative embodiment of the invention, the encryption key may be based on node specific information, such that if a node has been altered or modified, the encryption algorithm will generate a different key than a node that has not been altered or modified. In this embodiment, the key may be generated based on similar heuristics as can be used for validation, described above. In still another alternative illustrative embodiment, both validation and node-based encryption keys may be used.

After encryption, the sending node sends the encrypted message to a peer node (the receiving node) in step 609. Upon receiving the encrypted message, the receiving node decrypts the message in step 611 using the same black box assembly as the sending node. In any embodiment where the black box assembly performs node validation, the receiving node is assured that the sending node has not been altered or modified by virtue of receiving an encrypted message, and the receiving node may decrypt and safely processes the message.

In the illustrative embodiment described above where the encryption key is based on the sending node itself, the receiving node attempts to decrypt the message using a key generated by the black box assembly in the receiving node. If the decryption is not successful, the receiving node knows that either a new black box assembly has been distributed (described below), which the receiving node has not yet received, or that either the sending node or receiving node has been altered or modified. In such a case, the receiving node may send an unencrypted status message to the sending node to determine the version of the black box assembly presently being used in each node. The sending node may reply with another unencrypted status message, indicating its black box assembly version.

When the black box assembly version in both the sending and receiving nodes match, and the decryption (or other authentication) was unsuccessful, the receiving node determines that either the sending node or the receiving node has been altered or modified, and the receiving node may ignore or delete the received message, report or log the modified node, or perform some other corrective action. When the black box assembly versions do not match, the node with the more recent version of the black box assembly may send the black box assembly to the node with the older version, as described below, and the receiving node may retry to decrypt the message.

As stated above, virtually any encryption algorithm can be reverse engineered given enough time. This is also true of the executable code in which the algorithm is stored. That is, the software in which the black box assembly is stored can be reverse engineered so that an attacker would not need to reverse engineer the encryption algorithm. Once the software is reverse engineered, an attacker might be able to disable or neutralize the validation and/or encryption mechanisms, and might send spoofed messages disguised as legitimate messages to other nodes, and attack the other nodes using the spoofed messages. To mitigate against such an attack, a new black box assembly may be distributed at synchronized intervals.

A central server (e.g., server 253 in FIG. 2) may send a new black box assembly to each node in a networked environment at predesignated times or intervals, such as when a current black box assembly is known to have been compromised, or at regular intervals of time. Preferably, the server sends a new black box assembly in intervals shorter than it might take for an attacker to reverse engineer the current black box assembly. For example, the server may send a new black box assembly every five minutes, or any other interval amount. Generally, an interval of less than 15 minutes or less is preferred, given a sufficiently resilient black box. However, shorter or longer intervals may alternatively be used based on design criteria.

The server might not send each new black box assembly to every node. Instead, the server may send the new black box assembly only to one or more nodes, which can subsequently propagate the new black box assembly to other nodes until all nodes have been updated. When the server sends a new black box assembly, the server preferably signs the black box assembly using known digital signature techniques so that each node that subsequently receives the black box assembly can validate that the new black box assembly actually originated from the server or some other trusted source (as opposed to being spoofed by an attacker). This distribution method also serves to lighten the access load on the central server at update times. In addition, the digital signature can be used to help authenticate black box versions when two nodes are comparing each node's current black box version to the other.

Alternatively to the server automatically sending out new black box assemblies, each node may poll the server at predetermined intervals to check whether a new black box assembly is available. Each peer might also poll the server when decryption fails instead of sending a status message to the sending node, as described above, so as not to alert the sending node that a node is potentially altered without authorization. The receiving node may simply retrieve the updated black box assembly from the server and retry authenticating the received message using the new black box assembly. If the authentication still fails, the receiving node knows that the sending node was modified or altered, and can ignore the message or perform some other corrective or preventative measure.

Preferably, the server never releases the same black box assembly twice. In addition, each black box assembly should not be generated based on a formula that can be reverse engineered such that any black box assembly could be mechanically reverse engineered using preprogrammed software. That is, if an attacker can reverse engineer the formula used to generate black box assemblies, the attacker might be able to reverse engineer or crack a black box assembly as soon as the black box assembly is distributed from the server. Thus, each black box assembly should be based on a formula that, at least in part, randomly or subjectively creates encryption and/or validation functions using the techniques described above.

Validating the host node or generating a protection key based on the host node, in combination with changing the black box assembly at synchronized intervals, provides a reasonable guarantee that modified nodes cannot participate in an unbounded computing space because modified nodes will not be able to communicate with other unmodified peers. In addition, even if an attacker cracked a black box assembly before a new black box assembly was distributed, the attacker would not have much time to exploit the cracked black box assembly before the new black box assembly is distributed and would block out the attacker.

In one illustrative embodiment, in order to prevent an attacker from using a spoofed black box assembly to attack a node, each node in the unbounded computing space may be defined to load each black box assembly into a CLR application domain which has a security policy indicating that only black box assemblies signed with the same key as the host executable have permission to perform any "dangerous" actions on the system (e.g., reading/writing files). Requiring consistent signature keys also ensures that a spoofed host could not execute a legitimate black box assembly to send spoofed messages to other nodes. At most an attacker might be able to stop communications between one peer and another peer. However, this may be prevented by requiring nodes to obtain black box assembly updates from the server using a secure socket layer (SSL), or similar secure communication, and not allowing nodes to obtain updates from other peer nodes. In an alternative illustrative embodiment, each node may only require that a black box is signed with an acceptable digital signature, as opposed to the same digital signature of the host executable. Thus, black boxes could originate from multiple trusted sources.

One of skill in the art will appreciate that other non-symmetric encryption authentication schemes may also or alternatively be used. For example, a symmetric key may be used to encrypt an asymmetric key sent in the message. In another example, watermarking or hashing could be used (optionally in combination with encryption) to authenticate the message as originating from an unaltered node. The validation module may create a hash key based on an environmental determination (e.g., using HMACS, or as described above). Before sending the message (either encrypted or clear-text), the sending module (using the Protect method) can hash the message and use the key as input to the hash. When the receiver's Authenticate method code runs, it can independently compute the hash key based on its own environment, and re-hash the message (after decryption if the message is sent encrypted). If the receiver's hash digest does not match that sent with the message, the message is invalid.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A method for protecting against software tampering in a node in a distributed computing system, comprising:
   (a) encrypting a message using a predetermined encryption algorithm at a first node, wherein the predetermined encryption algorithm uses a protection key based at least in part on node-specific information of the first node and at the first node any new activity resulting from a new software module introduction that would subsequently be copied or transferred to a second node must be first validated at the first node and, the node-specific information changes if node software in the first node is altered by an underlying change in the composition of node-specific information;
   (b) sending the encrypted message to a second node along with the underlying change in the composition of the node-specific information of the first node if a change occurs at the first node by the new software module introduction; and
   (c) receiving the encrypted message at the second node along with the underlying change in the composition of the node-specific information of the first node if a change occurs at the first node by the new software introduction;
   (d) decrypting the encrypted message using the predetermined encryption algorithm and an authentication key, wherein the authentication key is based at least in part on node specific information of the second node, wherein the node-specific information changes if node software in the first node is altered by an underlying change in the composition of the node-specific information; and (e) periodically changing the predetermined encryption algorithm or the node-specific information upon which the protection and authentication keys are based.

2. The method of claim 1, wherein the predetermined encryption algorithm is changed when a predetermined event occurs.

3. The method of claim 2, wherein the predetermined event comprises a predetermined amount of time having elapsed.

4. The method of claim 1, wherein the predetermined encryption algorithm is changed when the predetermined algorithm has been compromised.

5. The method of claim 1, wherein the predetermined encryption algorithm comprises encrypting an asymmetric key using a symmetric key.

6. The method of claim 1, wherein the predetermined encryption algorithm comprises a symmetric encryption algorithm.

7. The method of claim 1, wherein the predetermined encryption algorithm comprises hashing.

8. The method of claim 1, wherein the predetermined encryption algorithm comprises watermarking.

9. The method of claim 1, further comprising:
(f) determining whether a new predetermined encryption algorithm is available when step (d) fails to decrypt the received encrypted message; and
(g) when a new predetermined encryption algorithm is available, the second node retrieving the new predetermined algorithm and decrypting the received encrypted message using the new predetermined algorithm.

10. The method of claim 9, further comprising ignoring the received encrypted message when either a new predetermined algorithm is not available in step (f), or the decryption of step (g) fails.

11. A method for validating a node in a distributed computing system, comprising:
(a) validating a host node using a predetermined validation scheme based on physical characteristics of the host node and any managed agents including any independent nodes that communicate through the host node within the distributed computing system to allow dynamic changes to the host node without having to previously communicate the changes to a centralized server;
(b) encrypting a message using a predetermined key and a predetermined encryption algorithm when the host node is successfully validated in step (a);
(c) sending the encrypted message to a peer node;
(d) receiving the encrypted message at the peer node;
(e) validating the peer node using the predetermined validation scheme based on physical characteristics of the peer node and, when validation is successful, decrypting the encrypted message using the predetermined key and the predetermined encryption algorithm; and
(f) changing the predetermined validation scheme when a predetermined event occurs.

12. The method of claim 11, wherein the physical characteristics of the host node comprise physical characteristics of an executable image in a memory of the host node.

13. The method of claim 11, further comprising:
(g) determining whether a new predetermined algorithm is available when step (e) fails to decrypt the received encrypted message; and (h) when a new predetermined algorithm is available, the peer node retrieving the new predetermined algorithm and decrypting the received message using the new predetermined algorithm.

14. Distributed computer system comprising:
a node that authenticates a peer node based on a received message
a protection module for altering messages using a predetermined algorithm that allows each message to be subsequently authenticated, and a protection key based at least in part on node specific information that includes specific parameter information relating to a security control routine and a node that introduces the peer node acting as an independent agent, allows the peer node acting as an independent agent to run on the node that conducts the introduction, and to allows the node that conducts the introduction to evaluate whether the peer node acting as an independent agent alters node software present on the node conducting the introduction;
an authentication module for authenticating altered messages received from other nodes using the predetermined algorithm and an authentication key based at least in part on the node specific information;
control logic that permits the node to process a message when the message is successfully authenticated by the authentication module; and
wherein the control logic, when the authentication module unsuccessfully authenticates the message, polls a server to determine whether a new predetermined algorithm is available and, if so, retrieves the new predetermined algorithm from the server for use by the protection and authentication modules.

15. The node of claim 14, further comprising a validation module that validates the node based on a physical characteristic of the node, and where successful validation is required prior to performing protection or authentication by the protection module and authentication module, respectively.

16. The node of claim 15, wherein the predetermined algorithm comprises encrypting an asymmetric key using a symmetric key.

17. The node of claim 15, wherein the predetermined algorithm comprises a symmetric encryption algorithm.

18. The node of claim 14, wherein the predetermined algorithm comprises hashing.

19. The node of claim 14, wherein the predetermined algorithm comprises watermarking.

20. The node of claim 14, wherein the node further comprises control logic that checks for a new predetermined algorithm when a predetermined event occurs.

21. The node of claim 14, wherein the predetermined event comprises a predetermined amount of time having elapsed.

22. The node of claim 14, further comprising control logic that causes the node to ignore the message when either no new predetermined algorithm is available, or the decryption module fails to decrypt the message using the new predetermined algorithm.

23. A computer storage readable medium storing computer readable instructions that, when executed, cause a computer system to perform a method for validating a sending node, comprising:
validating the sending node using a predetermined validation scheme based on characteristics of a program environment provided by the sending node, by comparing elements of the program environment to expected values to allow a dynamic change to the characteristics of a program environment of the sending node, without having to communicate the change to a centralized server;

when the comparing step is successful, encrypting a message to be sent to a peer node based on a predetermined encryption algorithm, wherein the predetermined encryption algorithm includes a protection key that is based on node specific information corresponding to the sending node that includes specific parameter information relating to a security routine and an evaluation by the sending node to determine whether the dynamic change to the characteristics of a program environment of the sending node are present; and periodically changing the predetermined validation scheme and the node-specific information on which the protection key is based.

* * * * *